Feb. 20, 1951  H. F. SULLIVAN  2,542,593
METHOD OF MAKING CIRCULAR BODIES
OF LAMINATED PLASTIC

Filed April 11, 1947  2 Sheets-Sheet 1

Inventor:
H. Frank Sullivan
By: *Chritton, Schroeder,*
*Merriam & Hofgren*
Attorneys Feb. 20, 1951   H. F. SULLIVAN   2,542,593
METHOD OF MAKING CIRCULAR BODIES
OF LAMINATED PLASTIC
Filed April 11, 1947   2 Sheets-Sheet 2
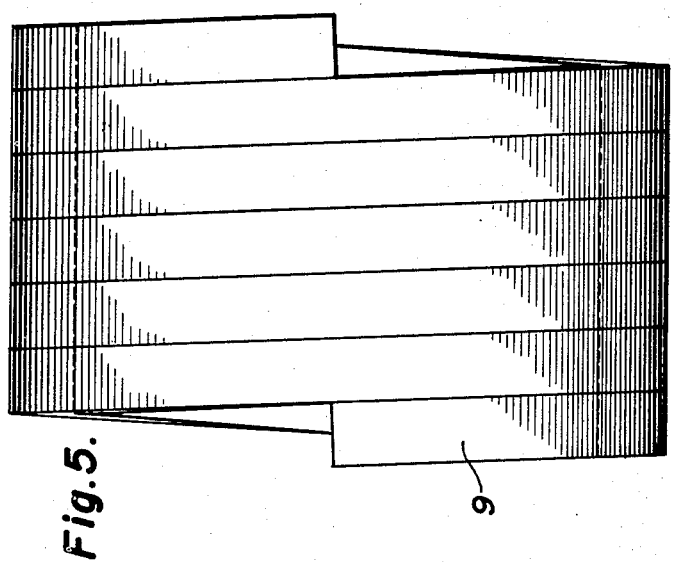
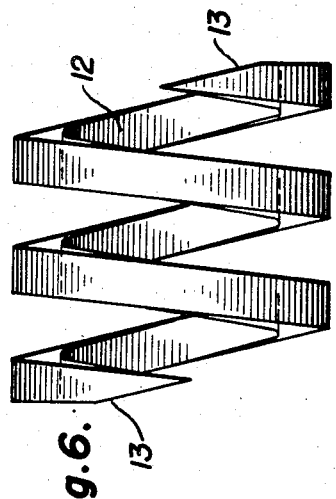
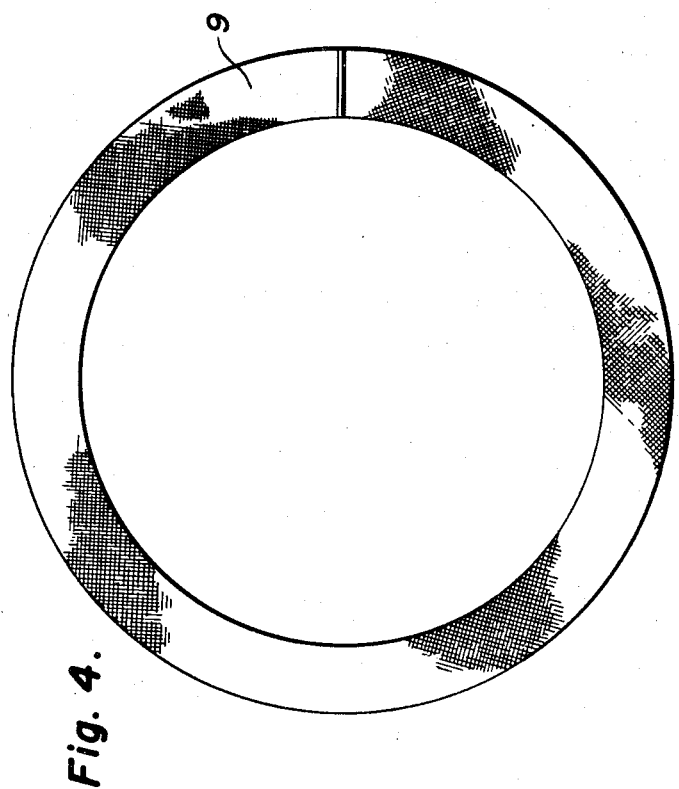
Inventor:
H. Frank Sullivan
By: Shutton, Schroeder,
Merriam & Hofgren
Attorneys Patented Feb. 20, 1951

2,542,593

UNITED STATES PATENT OFFICE 2,542,593

METHOD OF MAKING CIRCULAR BODIES OF LAMINATED PLASTIC

Henry Frank Sullivan, Cincinnati, Ohio, assignor to The Formica Company, a corporation of Ohio Application April 11, 1947, Serial No. 740,899

5 Claims. (Cl. 154—81)

This invention relates to a process of making piston rings, springs, and the like, of laminated plastic material which is reinforced with a fabric.

The primary object of the invention is to provide an improved circular body of laminated insulating material wherein the woven threads in the reinforcing fabric each approach the outer edge at an angle so that a substantially uniform wearing surface is provided. It is well known that reinforced laminated insulating material, impregnated with a phenolic condensation product, presents a better wearing surface when the threads have their ends presented to the surface rather than their sides. However, this result is very difficult to obtain in circular bodies by the methods heretofore used.

Another object of the invention is to provide an improved method for making coil springs with a minimum waste of the laminated insulating material.

The invention is illustrated in a preferred embodiment in the accompanying drawings in which—

Figure 1:
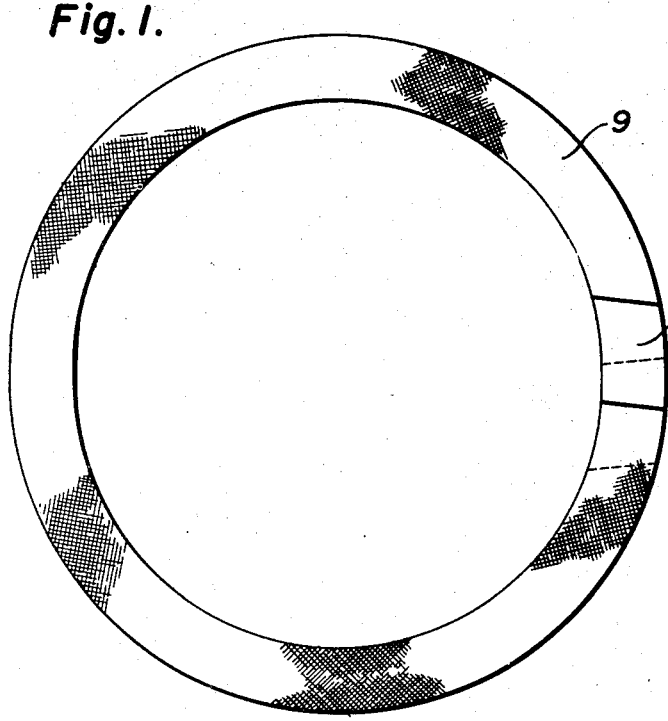
Figure 2:
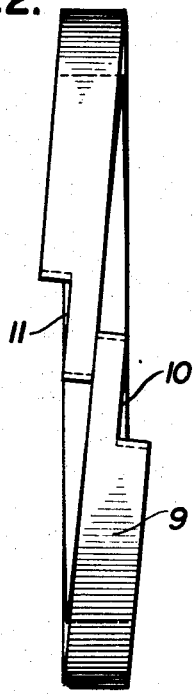
Figure 3:
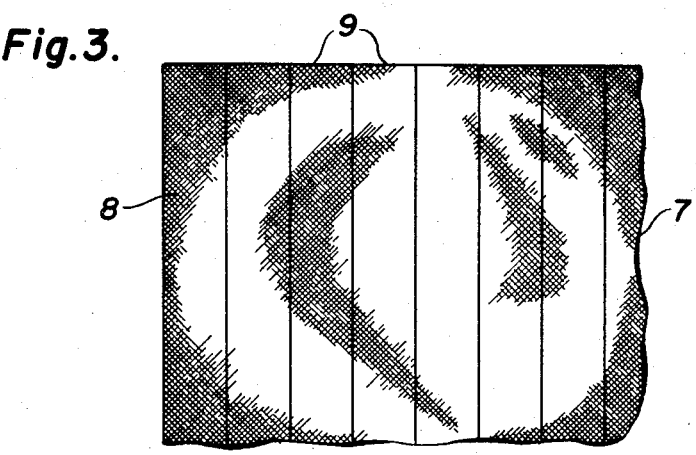

Figure 1 is a plan view of a piston ring before the ends have been sprung into complementary positions; Fig. 2, a side elevational view of the ring shown in Fig. 1; Fig. 3, a fragmentary plan view of a block of material from which strips are cut prior to forming them on a mandrel; Fig. 4, an end elevational view of a helix before it has been cut up into rings; Fig. 5, an elevational view of the same; and Fig. 6, a side elevational view of a coil spring formed by the improved process.

For many years, laminated insulating products have been manufactured by impregnating a fabric of canvas, or the like, with phenol formaldehyde resin, or urea formaldehyde resin, placing a series of the sheets in superposed relation and consolidating the assembly under heat and pressure to what is commonly known as the C-stage. The thermo-setting resin was thereby made infusible and substantially insoluble, and it was thought that further bending of the material could not be done. However, more recently it has been discovered that even after the material has reached the C-stage, it can be heated quickly, sometimes referred to as "flash heated," to a temperature of about 500° F. and given a desired shape by the application of pressure.

In the present invention, a laminated assembly 7, of the type shown in Fig. 3, may be formed by superposing a sufficient number of sheets to give the desired thickness, and arranging the sheets so that the warp and woof threads are substantially parallel or perpendicular to the warp and woof threads of the other sheets before the assembly is consolidated under heat and pressure. Thus, all of the threads will be angularly disposed to the edges 8 of strips 9 which are subsequently cut from the block. It will be noted that none of the threads are parallel to the edges 8. One of the strips 9 is then heated quickly to a temperature of about 500° F. and wound around a mandrel, so that when cool it will assume the shape shown in Fig. 5. It will be noted that the threads still make a bias pattern with a tangent to the outer surface of the coil, and that none of the threads are disposed parallel to a tangent. The coil may then be cut up and the ends of the convolutions provided with cut-out portions 10 and 11, as shown in Fig. 2. As the ring is resilient, it may be sprung so that the shoulders provided by the cut-outs 10 and 11 will complement each other and form a piston ring which may be shaped and ground to a desired size in the usual manner.

As the outer wearing surface of a piston so formed is uniform, it will give long and useful service without wearing flat surfaces and getting out of round.

A somewhat similar method may be used to form a spring 12, as shown in Fig. 6. However, in forming such a structure, the heated strip is either wrapped around a mandrel with the desired spaces between convolutions, or two parallel strips are wound around a mandrel together. Preferably, the end portions of the spring are trimmed away, as indicated at 13, by cutting them in a plane perpendicular to the axis of the coil, and provide suitable bearing surfaces at the end of the coil. Springs of this type are particularly useful in machinery handling liquids that are very corrosive to steel. While the outer wearing surface is not so important in a spring as it is in a piston ring, an improved spring is provided by this method, because the reinforcing fabric is arranged uniformly throughout the structure.

The foregoing detailed description is given for clearness of understanding only, and no unnecessary limitations should be understood therefrom, for some modifications will be obvious to those skilled in the art.

I claim:

1. The method of making circular bodies of laminated insulating material which comprises: superposing sheets of fabric, impregnated with a phenolic condensation product, so that the warp and woof threads in each sheet are arranged substantially in parallel or perpendicular relation to the direction of the warp and woof threads in the other sheets; consolidating the assembly under heat and pressure to the C-stage; cutting the assembly into parallel strips so that the warp and woof threads in the assembly each extend in from the edge portion at an angle of about forty-five degrees; quickly heating the strip to a temperature of about 500° F. and wrapping it edgewise around a mandrel; and cooling to room temperature.

2. A method as specified in claim 1, including cutting the ends of the cooled assembly in a plane perpendicular to the axis of the coil to form a compression spring.

3. A method as specified in claim 1, including cutting complementary shoulders in the ends of a convolution of the assembly and springing the ends into overlapping relationship so as to form an annulus.

4. A circular body of laminated sheets of fabric impregnated with a phenolic condensation product and consolidated to the C-stage, both the warp and woof threads in the fabrics being angularly disposed to the circumference of the body so as to afford a substantially uniform outer surface.

5. A piston ring comprising an annulus with overlapping ends, said annulus having a body of laminated sheets of fabric impregnated with a phenolic condensation product and consolidated to the C-stage, both the warp and woof threads in the fabrics being angularly disposed to the circumference of the body so as to afford a substantially uniform outer surface.

H. FRANK SULLIVAN.

REFERENCES CITED

The following references are of record in the file of this patent:

UNITED STATES PATENTS

| Number | Name | Date |
|---|---|---|
| 1,213,051 | Wickes | Jan. 16, 1917 |
| 1,315,896 | Wright | Sept. 9, 1919 |
| 1,501,026 | Guay | July 8, 1924 |
| 1,561,222 | Frederick | Nov. 10, 1925 |
| 1,622,048 | Pierson | Mar. 22, 1927 |
| 2,092,086 | Saharoff | Sept. 7, 1937 |
| 2,229,982 | Mansur et al. | Jan. 28, 1941 |
| 2,301,319 | Peters | Nov. 10, 1942 |
| 2,433,643 | Beach et al. | Dec. 30, 1947 |